United States Patent [19]
Friedman et al.

[11] 4,446,161
[45] May 1, 1984

[54] AROMATIC, MONOHYDRIC ALCOHOLS AS PRESERVATIVES FOR FOODS

[75] Inventors: Herman H. Friedman, Forest Hills; Frank Del Valle, Croton-on-Hudson; Lisa A. Hofmann, Yonkers, all of N.Y.

[73] Assignee: General Foods Corporation, White Plains, N.Y.

[21] Appl. No.: 362,720

[22] Filed: Mar. 29, 1982

[51] Int. Cl.³ ............................................... A23K 1/00
[52] U.S. Cl. ..................................... 426/335; 426/72; 426/74; 426/532; 426/623; 426/630; 426/646; 426/805
[58] Field of Search ................... 426/72, 74, 332, 335, 426/532, 630, 635, 805, 807, 623, 646

[56] References Cited
U.S. PATENT DOCUMENTS 3,955,005  5/1976  Trelease et al. ................. 426/332 X
4,158,706  6/1979  Ernst et al. ....................... 426/805 X

OTHER PUBLICATIONS

The Merck Index, Ninth Edition (1976) Published by Merck & Co., pp. 148, 197 and 937.

Primary Examiner—R. B. Penland
Attorney, Agent, or Firm—T. R. Savoie; D. J. Donovan; J. T. Harcarik

[57] ABSTRACT

The object of the invention is to provide an improved shelf-stable food, which is reliably stable against microbial attack without need to resort to pasteurization. The disclosed food products contain a preservative system comprising an aromatic alcohol selected from the group consisting of benzyl alcohol, 2-phenyl ethanol, sec-phenyl ethanol, 3-phenyl-1-propanol, 1-phenyl-1-propanol, 2-phenyl-1-propanol, 2-phenyl-2-propanol, 1-phenyl-2-butanol, 2-phenyl-1-butanol, 3-phenyl-1-butanol, 4-phenyl-2-butanol, dl-1-phenyl-2-pentanol, 5-phenyl-1-pentanol, 4-phenyl-1-butanol, and combinations of these. The products can be nutritionally-balanced pet food and contain moisture contents within the range of from about 12 to 80%. According to a preferred embodiment, the amount of aromatic alcohol will comprise from about 0.75 to about 1.25% of the moisture content of the food. The food products are stabilized against microbial growth including bacteria, molds and yeasts, as well as against infestation by mites.

14 Claims, No Drawings

AROMATIC, MONOHYDRIC ALCOHOLS AS PRESERVATIVES FOR FOODS

DESCRIPTION

1. Technical Field

The present invention relates to food preservation, and particularly to a preservation system which provides improved food products.

A significant advance in food preservation was made with the development of intermediate-moisture foods for both human and animal use. Typically, foods having moisture contents of greater than 15% will spoil if not aseptically packaged or treated with preservatives. But, by limiting the amount of water for microbial growth by employing low moisture contents of less than about 50%, and adding effective levels of water binding agents, intermediate-moisture foods can be made stable with very low levels of antimicrobial preservatives. Recently, shelf-stable foods have been prepared containing moisture contents in the range of about 80% and above.

It has always been a challenge to workers in this art to find preservatives which are palatable, and which also are compatible with the intended food product. Many of the known preservatives, such as propylene glycol and glycerol, are palatable in limited amounts but tend to take on objectionable taste characteristics at higher concentrations. Further, many of the known preservatives or water binders are palatable in their own right but tend to be incompatible with certain flavors. For example, sugar is quite pleasing in taste but does not taste good with many meat dishes, especially when used at levels effective to impart a significant preservative effect.

The need to balance flavor and effectiveness is further complicated by the need to produce a microbiologically-stable food product at a cost which is competitive with other forms of the same or substitute products. The cost factor in the balance is constantly changing and presents the possibility that, at any given time, the preferred preservative system might become uneconomical.

Moreover, while intermediate-moisture and higher-moisture-content foods can be rendered stable against spoilage by the growth of bacteria, yeasts and fungus by employing a preservation system based principally upon water soluble ingredients such as sugars, salts, acids, polyhydric alcohols and certain antimycotics such as sorbic acid and its salts, they may still be subject to spoilage by the growth and infestation by minute arachnids or mites. Mites thrive on intermediate-moisture foods, especially those which are nutritionally balanced and undergo extensive storage times which permit undesirable reproduction and growth.

The problem of mite control did not occur before the existence of soft, moist, intermediate-moisture foods which have an ideal moisture content for mites. Storage for long time periods at room temperature, rather than in a cooler or freezer, and in any moisture impermeable wrapping material, has prompted the need for controlling mites without resorting to insecticides which are not compatible with food utility. To effectively protect the food from mites, it has been necessary to employ either an additional preservative or a higher level of certain preservatives, such as propylene glycol, which are effective against mites only at concentrations higher than would be necessary for controlling microbial growth. Thus, the flavor and cost considerations discussed previously with regard to control of microbial growth are compounded when control against mite contamination is also required.

It would be desirable to provide additional, effective preservatives for use in food systems to provide a wider range of choice in striking the balance between taste, effectiveness and cost.

2. Background Art

The art has produced a large number of intermediate moisture food products. U.S. Pat. No. 3,202,514 to Burgess et al, for example, describes pasteurized, intermediate-moisture animal foods based principally upon proteinaceous meaty materials. The products are shelf-stable and resistant to microbial decomposition without the need for sterilization, refrigeration or aseptic packaging. The meaty animal food is stabilized by "water soluble solids", principally sugar. The function of these solutes is to bind up the available water in which microorganisms normally grow.

In addition to the preparation of animal foods, intermediate moisture technology has also been employed to prepare foods intended for human consumption. For example, in U.S. Pat. No. 3,769,042 to Kaplow et al, there is described a process for preparing an intermediate-moisture beef stew. Briefly stated, meat and vegetable pieces are stabilized by infusion with solutes by immersion in a measured excess of an aqueous stabilizing solution, and the excess aqueous infusion solution can be retained to form a stabilized gravy. The water activities of the liquid and solid phases will be the same, within the range of from 0.6 to 0.9. And, in U.S. Pat. No. 3,753,734, also to Kaplow et al, there is described the preparation of shelf-stable pancake batters and pancakes. The batter includes water-soluble solids at least equal in weight to the moisture content, with edible polyhydric alcohols constituting the principal source of water-soluble solids.

These patents are merely representative of the various types of foods which have been rendered shelf-stable by the use of intermediate moisture technology. Because of the well-known taste and cost limitations of the known stability systems for products of this type, the search for alternatives has been active as evidenced by a large number of patents and other technical publications. More recently, a number of patents have been published which disclose food products with higher moisture contents than those typically considered to be intermediate moisture, but which still remain stable much in the manner of intermediate-moisture products.

Among the disclosures of higher moisture foods is U.S. Pat. No. 3,922,353 wherein Bernotavicz describes what is said to be a high moisture, shelf-stable product. This product contains at least 50% cooked meat and greater than 50% moisture. It has a water activity of greater than 0.90 and further contains from 1 to 35% gelatinized starch, a low level of an antimycotic, and from 1.7 to 3.8% of an acid which maintains the pH within the range of from 3.9 to 5.5. Similarly, Ernst et al discloses a high moisture pet food in U.S. Pat. No. 4,158,706 which is stabilized by the use of from 0.5 to 5.0% of an acid selected from the group consisting of succinic acid, pyruvic acid, and fumaric acid. Another highly-acidifed product is disclosed by Cheney et al in U.S. Pat. No. 4,168,328. According to this disclosure, the food product can have a moisture content of up to 95% by appropriately stabilizing the product at a pH value of 4.5 or below. The use of high acid contents, as with the use of high contents of other antimicrobial agents such as salt, sugar, and polyhydric alcohols, imposes a definite characteristic flavor which limits the number of uses for which the formulations can be employed with high levels of acceptability.

Throughout the development of microbiologically-stable food products, polyhydric alcohols have played a prominent role in achieving stability. On the other hand, even though certain monohydric alcohols have known antimicrobial properties, they have received little attention. For example, ethanol is a known food preservative but is not frequently employed as a food preservative in traditionally non-alcoholic food products. Similarly, while benzyl alcohol is disclosed by Macht et al in *Jour. of Pharmacol. and Exp. Therap.*, 1918, XI, page 263, as having rapid bactericidal action, and in the *Merck Index*, 9th Edition, 1976, at page 148, as being bacteriostatic, it has not been previously disclosed as being useful in the preparation of food products which remain shelf-stable in the absence of conventional packaging which requires retorting. Similarly, while 2-phenyl ethanol has been described as antimicrobial in the *Merck Index*, 9th Edition, at page 937, it likewise has not been employed as a food preservative for shelf-stable products.

Moreover, while certain aromatic alcohols, such as benzyl alcohol and 2-phenyl ethanol, have been employed, at low levels, as carriers for flavors and as flavors per se, there is no prior art teaching or suggesting that they would be useful in the production of an improved food product which will remain stable against the growth and reproduction of microbiological organisms or mites.

DISCLOSURE OF THE INVENTION

In accordance with the present invention, it has been discovered that a group of non-toxic aromatic monohydric alcohols have a high degree of effectiveness as preservatives in food compositions, which would be susceptible to spoilage in the absence of a preservation system. Both the food compositions and the method for preparing the food compositions, as improved through the use of the named aromatic alcohols, are disclosed.

The improved, microbiologically-stable food is typically of the type containing fat, proteinaceous ingredients, and farinaceous ingredients, and also contains a preservative system effective to prevent microbiological spoilage which would occur in its absence, wherein the improvement is characterized by: employing as a part of the preservation system, an aromatic alcohol selected from the group consisting of benzyl alcohol, 2-phenyl ethanol, sec-phenyl ethanol, 3-phenyl-1-propanol, 1-phenyl-1-propanol, 2-phenyl-1-propanol, 2-phenyl-2-propanol, 1-phenyl-2-butanol, 2-phenyl-1-butanol, 3-phenyl-1-butanol, 4-phenyl-2-butanol, dl-1-phenyl-2-pentanol, 5-phenyl-1-pentanol, 4-phenyl-1-butanol, and combinations of these.

According to the method, a microbiologically-stable food product is prepared by adding one or a combination of the above-listed aromatic alcohols in an amount effective in the total food composition (which can contain additional preservatives, if desired), to protect the food against bacterial, yeast and mold growth. Preferably, the aromatic alcohols will be employed in amounts effective to also prevent the growth and reproduction of mites.

The food compositions can be made for human or animal consumption. The particular type of food product is not critical to the invention which resides in the discovery that the named monohydric aromatic alcohols are highly effective antibacterial, antimycotic and antimite agents for preserving food compositions, and make possible the reduction or elimination of other conventionally-employed preservatives. The compositions may be meat-like or meat-containing foods such as animal foods, meat analogs, vanilla cream or chocolate fillings and the like. Since the alcohols of this invention possess antibacterial, antimycotic and anti-mite functions, it is possible to substitute for all or a portion of the commonly used antibacteriocidal agents (e.g. sodium benzoate), antimycotic agents (e.g., potassium sorbate) and anti-mite agents (e.g., propylene glycol). When used as a preservative the alcohols of this invention are employed at levels in excess of 0.1%, preferably in excess of 0.25% by weight of the foodstuff. According to one embodiment of this invention a food product is stabilized by a preservation system containing one or more of the monohydric, aromatic alcohols named herein but is free of other antimite agents such as propylene glycol.

Broadly, the present invention is concerned with preserving all food products from microbial growth, including bacteria, mold and yeast, and preferably the growth and reproduction of mites, which would normally occur in the absence of a preservative system. The invention is not dependent upon any specific water activity or moisture content. The invention is applicable to use on foods which may be microbiologically stable or stable to mite growth and reproduction if stored alone, but become susceptible due to their being packaged in conjunction with other food materials from which moisture might migrate. It is also applicable to foods packaged in materials which may permit the entrance of moisture after extended periods of storage and to foods which may pick up moisture after opening.

Typically, however, the invention will have its greatest applicability to products having moisture contents within the range of from about 12 to 80% based upon the weight of the food. Prominent among these products are those having moisture contents of from about 12 to 50%, which are generally thought of as "intermediate-moisture". Among these intermediate-moisture products, the more typical moisture level will be within the range of from about 15 to about 35% based upon the weight of the product. Additionally, higher-moisture-content products, with moistures within the range of from 50 to 80%, can also be protected according to the invention.

In all cases, the preservation system of the invention will provide little, if any, negative impact on the ultimate flavor; and, in many cases, the natural flavors of these compositions will actually enhance their palatability. As with prior art compounds, however, it is possible to employ them at levels less than required for complete preservation where the balance of effectiveness is provided by other preservatives. Therefore, the food compositions will typically contain other preservatives in addition to the named aromatic alcohols, so that no one preservative flavor becomes so pronounced that it impairs the usefulness of the food product for its intended purpose. The amount of the aromatic alcohol or alcohol combination employed will be that which is effective, in the presence of the other preservatives and at the given moisture and pH to stabilize the food product against mold and bacterial attack, and preferably also against the growth and reproduction of mites. It is possible, however, to employ one or more of the monohydric aromatic alcohols as the sole, anti-mite agent in the peservation system.

The preservation of moisture-containing foods from microbial decomposition is dependent upon a variety of factors and mechanisms. There are some generally well-accepted preservation mechanisms and systems which have evolved in the art, and any preservation system effective for achieving shelf stability in the final product when employing one or more of the disclosed aromatic alcohols, which is acceptable for the particlar end use, can be employed according to the invention.

The usual mechanisms are generally based on a combination of principals and exert a combined stabilizing effect. The disclosures of Burgess et al in U.S. Pat. No. 3,202,514; Kaplow et al in U.S. Pat. No. 3,753,734; Bernotavicz in U.S. Pat. No. 3,922,353; and Horrochs et al in U.S. Pat. No. 4,001,445, are incorporated by reference in this regard.

Typical preservation systems employ antimicrobial agents as well as materials which control the amount of moisture in a system available as a growth medium. The expression typically employed for defining the amount of water available to support microbial growth is the "water activity", $a_w$, of a product. The $a_w$ is equal to the vapor pressure of water in the system, divided by the vapor pressure of pure water at the same temperature. Theoretically, the $a_w$ of a given system can be lowered to such a degree that the water is not sufficiently available to support any microbial growth. However, to achieve the proper taste and texture for food products, especially intermediate-moisture food products which are intended to simulate meat, it is not possible as a practical matter to obtain these low $a_w$ values. Thus, antimycotics are also added to control mold growth which is not sufficiently retarded at the $a_w$ values involved.

The amounts of water-soluble materials employed in most foods will be effective to reduce the water activity from unity; however, it is not necessary to reduce it below 0.90. For high-moisture-content products, e.g., those containing from 50 to 80% water, it is desired to control the $a_w$ to within the range of from 0.90 to 0.98. At these high water activities it is clearly critical that the microbiological growth control system be unfailingly effective, because any localized or other failure in the system could result in spoilage of the food. The high moisture content products of the present invention are especially advantageous when viewed from this standpoint, because they not only remain stable under the rigors of commercial distribution and storage, but are bacteriocidal under these conditions. The intermediate-moisture products, e.g., those having moisture contents up to about 50%, typically from 15 to 35%, will preferably have $a_w$ values of less than 0.93, and typically of from 0.80 to 0.90. Of course, products with lower $a_w$ values can be made and will be easier to stabilize.

The level of water binding ingredients and antimicrobial agents, including the aromatic alcohols described according to this invention, must be sufficient to keep the product resistant to microbial growth and decomposition when packaged in a substantially moisture-impermeable packaging material. The level of antimicrobial agents and $a_w$ lowering ingredients will be balanced to achieve stability at the given moisture content and pH. For example, it may be necessary to employ only a minor amount of antimicrobial agent where the $a_w$ of a given intermediate-moisture system is at a level nearly precluding all growth. Conversely, larger amounts of antimicrobial agents may be needed in moisture-containing system wherein the $a_w$ is closer to 0.93. The aromatic alcohols which have been identified according to the invention as useful and effective antimicrobials may be employed as the sole antimicrobials in some situations; however, in others, known antimicrobials such as glycol 1,2-propanediol, 1-3-butanediol, and the like may also be employed.

No precise numerical range of universal applicability in defining the effective levels of aromatic alcohols is possible; however, it presently appears that levels of from about 0.15 to about 1.0%, based on the weight of the food, provide a good balance between taste and effectiveness. The amount of aromatic alcohol employed will preferably be within the range of from about 0.15 to about 1.5%, based upon the moisture content of the food; and, more preferably, it will be employed at a level of from about 0.75 to about 1.25% of the moisture content of the food. Thus, where the food product is an intermediate-moisture food having a moisture content of within the range of from about 12 to 50%, the preferred level of aromatic alcohol will be within the range of from about 0.1 to about 0.75% of the weight of the total food composition. And, where the food is a higher moisture product having a moisture within the range of from about 50 to 80%, the preferred level of the aromatic alcohol will be within the range of from about 0.75 to about 1.0% based upon the weight of the food composition.

Useful as water binding ingredients are any of the edible materials which have the ability to tie up water to such an extent that it is no longer usable for microbial growth and propagation. Exemplary of this group of materials are sugars, polyhydric alcohols, mixtures thereof, and mixtures of alkali metal or alkaline earth salts with sugar and/or one or more polyhydric alcohols.

The useful polyhydric alcohols are preferably those having from 3 to 7 carbon atoms. Preferred dihydric alcohols are 1,2-propanediol and 1,3-butanediol. Glycerine, a trihydric alcohol, is a very effective water binder and may be used alone or in combination with a dihydric alcohol. Other useful polyhydric alcohols include tetritols, such as erythritol or the threitols; pentitols, such as ribitol or xylitol; hexitols such as sorbitol or mannitol; and heptitols, such as perseitol or volemitol. Certain of these, such as 1,2-propanediol and 1,3-butanediol also have antimicrobial and antimite properties.

Sugars useful as water binding agents include the reducing and non-reducing water-soluble mono- and polysaccharides; e.g., pentoses such as xylose and arbinose; hexoses such as glucose, fructose or galactose; and disaccharides such as lactose, sucrose and maltose. To be effective as a bacteriostatic agent, the sugars are preferably water-soluble and of such a low molecular weight as to be effective in increasing the osmotic pressure of the aqueous system in which they are dissolved. Preferred sugars are sucrose, dextrose and highly converted corn syrups, especially high fructose corn syrups.

Various alkali metal and alkaline earth metal halide salts are also effective water binding agents. Preferred salts are sodium chloride and calcium chloride.

The provision of an acid medium by the addition of acid or acid salts will also aid in preventing microbial decomposition. Preferred acids include phosphoric, citric, malic, fumaric, hydrochloric, sulfuric, lactic, acetic, adipic and the other non-toxic acids. Phosphoric acid is the most preferred due to its use as a source of phosphorous.

The pH of the product will be maintained within the range of from 4.0 to 8.0 to achieve the best results based on a balance of preservative effectiveness and taste; however, there are some food products which would taste best and can be prepared outside of this range. The most preferred pH range on this same basis is from 5 to 7.

The products of the present invention can be either liquid, semi-solid or solid in texture. To achieve a solid or semi-solid consistency, the products will preferably contain a proteinaceous or a carbohydrate-based binder or thickener. Heat- or acid-coagulable proteinaceous materials such as caseinates, gluten, modified soy proteins, and the like, can be employed to enhance cohesiveness. Among the suitable carbohydrate-based binders will be the various natural and modified gums and high molecular weight polysaccharides known to the art for having good binding properties in food systems, especially proteinaceous food systems at the pH value and ionic concentrations contemplated. Specifically identified as suitable are ionic polysaccharides such as the various carageenans, pectins, alginates, and the like. Preferred among these are pectin, especially low methoxy pectin, and kappacarageenan. The binder is preferably capable of forming a cohesive mass which will retain its shape within a temperature range of from about 0° to about 50° C. and is employed in an amount effective to meet this capability. While the proper level will vary with formulation, especially water content and proteinaceous materials present, levels within the range of from about 1.0 to 3.0% can be used effectively.

To better illustrate the present invention, the following description will focus on the preparation of intermediate-moisture and high-moisture pet foods, and especially those suited to the taste preferences of dogs and cats. It is to be understood, however, that the teachings of this invention are fully applicable to all foods.

The term "pet" as used in this description, means small to moderate-sized carnivorous animals of the types which are normally domesticated and maintained as household companions. Particularly, the description will focus on foods especially formulated to meet the nutritional requirements of dogs and cats.

It is preferred that all pet rations meet the entire nutritional requirements of the intended specie. By nutritionally balancing each pet ration, the pet owner is relieved of the burden of balancing the quantities of different foods supplied. And, the pet is relieved of the consequences which would normally flow from an unbalanced diet. The proper nutritional intake of the pet is assured as long as it intakes a minimum amount of food. Nutritionally-balanced pet foods contain protein, carbohydrate, fats, vitamins and minerals in the amounts known to the art and established by feeding tests to be sufficient for the proper growth and maintenance of the intended specie. A preferred dog food product of the invention will meet the known nutritional requirements for dogs.

The preferred pet foods of the present invention will contain a proteinaceous matrix which typically contains meaty poultry and/or fish materials. These materials are preferably comminuted. Useful as "meaty materials" are "meat", "meat by-products" and "meat meal". Of these, the "meat" and "meat by-products" will usually be ground in one or a series of stages. The term "meat" is understood to apply not only to the flesh of cattle, swine, sheep and goats, but also horses, and other mammals. The term "meat by-product" is intended to refer to those non-rendered parts of the carcass of slaughtered animals including, but not restricted to, mammals, and the like. Both the terms "meat" and "meat by-products" include such ingredients as are embraced by the terms as defined in the official publication of the Association of American Feed Control Officials, Incorporated. The term "meat meal" refers to the finely ground, dry, rendered residue from animal tissues, including those dried residues embraced by the term "meat meal" as defined by the aforesaid Association. Poultry and fish flesh and by-products can be used in a comparable manner.

The meaty, poultry and fish material will preferably constitute a significant portion of pet food products; typically, it will be greater than about 10% by weight and preferably greater than 20%. A usual range for such ingredients in intermediate-moisture dog foods is about 20% to 45%, preferably 25% to 40%, by weight. Higher-moisture products will contain proportionally less animal material and other solids due to the presence of a greater amount of moisture.

Non-animal proteinaceous materials, i.e., protein sources other than animal materials, are preferably employed to achieve a fully-balanced, nutritional feed ration, or can be employed in place of the meaty materials. Typically, the protein will be derived from a vegetable protein source such as soybean, cottonseed, peanuts and the like. The protein may be present in the form of grits, meal, flour, concentrate, isolate or the like. Additional protein and flavor may be derived from the meat meal and milk products such as dried buttermilk, dried skimmed milk, whey, casein and other like protein sources, such as eggs or cheese.

The various materials can be processed and packaged according to the procedures known in the art, modifying those procedures only by the addition of one or a combination of the aromatic alcohols identified according to the present invention as being wholly effective preservatives in food systems of the type described. One particularly preferred procedure for preparing intermediate moisture pet foods is that described in U.S. Pat. No. 3,202,514 to Burgess et al. According to the present invention, that process will no longer require as critical the various concentrations of sugar and other soluble solids disclosed therein. These modifications will be well within the skill of the art, especially in view of the description of specific formulations set forth in the following examples:

BEST MODE FOR CARRYING OUT THE INVENTION

The following examples are presented for the purpose of further illustrating and explaining the present invention and are not to be taken as limiting in any regard. Unless otherwise indicated, all parts and percentages are by weight.

EXAMPLE 1

This example describes the preparation of a 60% moisture, microbiologically-stable food product simulating meat chunks which is suitable for use as a dog food. The food is prepared from the following ingredients:

| Ingredient | Parts |
|---|---|
| Wheat gluten | 10.0 |
| Soya bean oil meal | 4.0 |
| Poultry meal | 3.0 |
| Meat meal | 1.5 |
| Corn meal | 1.2 |
| Tallow | 5.0 |
| Carrageenan | 2.5 |
| Potassium sorbate | 0.3 |
| Tween 80 | 0.25 |
| Span 80 | 0.75 |
| Benzyl alcohol | 0.5 |
| High fructose corn syrup (80% solids, 90% fructose) | 15.0 |
| Water | 56.0 |

To prepare the food, the carrageenan is added to the water at 70° C. and stirred to dissolve. The Tween 80, polyoxyethylene sorbitan monooleate available from Atlas Chemical, potassium sorbate, benzyl alcohol and the high fructose corn syrup (Isomerose 900, available from Clinton Corn Products) are added to the carrageenan solution and stirred vigorously to dissolve. The tallow is melted and the Span 80, sorbitan monooleate, available from Atlas Chemical, is added to it and mixed thoroughly. The tallow and aqueous solution are then mixed vigorously to emulsify. The remaining dry components are added with stirring to blend with the emulsion. The finished mix is added to a pan and autoclaved at 15 lbs gauge pressure for 20 minutes to heat set the mass. The heat-set cohesive product has a moisture content of 60% and is microbiologically stable. Without the benzyl alcohol component this formulation would not be microbiologically stable.

EXAMPLE 2

This example describes the production of a 70% moisture, microbiologically stable food product simulating meat chunks from the following ingredients:

| Ingredient | Parts |
|---|---|
| Wheat gluten | 7.48 |
| Soya bean oil meal | 2.96 |
| Poultry meal | 2.23 |
| Meat meal | 1.11 |
| Corn meal | 0.88 |
| Tallow | 3.70 |
| Carrageenan | 1.85 |
| Potassium sorbate | 0.30 |
| Span 80 | 0.75 |
| Tween 80 | 0.25 |
| 2-Phenylethanol | 0.50 |
| High fructose corn syrup | 10.10 |
| Water | 66.90 |

The process is the same as in Example 1.

EXAMPLE 3

This example describes the preparation of a microbiologically-stable gravy having moisture content of 60%. The formulation is as follows:

| Ingredient | Parts |
|---|---|
| Meat & bone meal | 9.45 |
| Yeast | 1.35 |
| Corn flour | 1.35 |
| Dried whey | 1.35 |
| Whole egg solids | 1.35 |
| Tallow | 9.45 |
| High fructose corn syrup | 20.23 |
| Potassium sorbate | 0.3 |
| Tween 80 | 0.25 |
| Span 80 | 0.75 |
| Benzyl Alcohol | 0.50 |
| Kelcosol | 0.14 |
| Water | 53.71 |

The process according to this example calls for first mixing the Span 80 with the tallow in melted condition. Next, a solution containing the high fructose corn syrup, water, potassium sorbate, Tween 80, kelcosol, sodium alginate, available from Kelco Co., and benzyl alcohol is prepared by heating the water to 60° C. and mixing. The solution is then stirred vigorously with the tallow to emulsify. The remaining dry materials are then added and stirred vigorously. No heating is necessary other than in the initial mixing of the fat and aqueous phases.

EXAMPLE 4

This example describes the preparation of a microbiologically-stable gravy having a moisture content of 70%. The following ingredients are combined according to the process of Example 3:

| Ingredient | Parts |
|---|---|
| Meat & bone meal | 7.0 |
| Corn flour | 1.0 |
| Brewers yeast | 1.0 |
| Dried whey | 1.0 |
| Whole egg solids | 1.0 |
| Tallow | 7.0 |
| High fructose corn syrup | 15.0 |
| Kelcosol | 0.1 |
| Potassium sorbate | 0.3 |
| Span 80 | 0.75 |
| Tween 80 | 0.25 |
| Sec-phenylethanol | 0.50 |
| Water | 65.00 |

EXAMPLE 5

Benzyl alcohol was incorporated as a preservative agent in a pet food formulation to form a solid kib. The formula and process used were the same as in Example 1, varying the percentages of ingredients as necessary to adjust for the variation of the moisture content within the range of from 25% through 70% and the variation of the benzyl alcohol content within the range of from 0.05 to 0.70%. All samples had a pH of 5.2. The results of inoculation of the kib samples, which were obtained by periodic plating out, are shown in Table A and in the Table of Minimum Effective Concentrations. The multi-component inoculum contained gram positive and gram negative bacteria, cocci, lactobacillus, yeasts and molds, all samples were stressed with $10^9$ cells per cubic centimeter and plated out weekly for a 16 week period at which time the heat was discontinued. A stability period of 16 weeks is indicative of a commercial, shelf-stable product.

TABLE A

Stability with Benzyl Alcohol

| % H₂O | % Benzyl Alcohol | Weeks Stable |
|---|---|---|
| 25 | 0 | 1 |
|  | 0.05 | 16 |
|  | 0.10 | 16 |
|  | 0.15 | 16 |
|  | 0.20 | 16 |
| 30 | 0 | 1 |
|  | 0.05 | 16 |
|  | 0.10 | 16 |
|  | 0.15 | 16 |
|  | 0.20 | 16 |
| 40 | 0.1 | 1 |
|  | 0.3 | 16 |
|  | 0.5 | 16 |
|  | 0.7 | 16 |
| 50 | 0.1 | 1 |
|  | 0.3 | 16 |
|  | 0.5 | 16 |
|  | 0.7 | 16 |
| 60 | 0.3 | 1 |
|  | 0.5 | 16 |
|  | 0.7 | 16 |
| 70 | 0.3 | 1 |
|  | 0.5 | 16 |
|  | 0.7 | 16 |

EXAMPLE 6

A study similar to Example 5 was carried out using a gravy formulation as prepared in Example 3, covering a moisture concentration range of from 40 to 70%. The pH of all samples was 5.2. Minimum effective benzyl alcohol levels were determined for each moisture range. The results are summarized in Table B and in the Table of Minimum Effective Concentrations.

TABLE B

Stability with Benzyl Alcohol

| % H₂O | % Benzyl Alcohol | Weeks Stable |
|---|---|---|
| 40 | 0.1 | 1 |
|  | 0.3 | 16 |
|  | 0.5 | 16 |
|  | 0.7 | 16 |
| 50 | 0.1 | 1 |
|  | 0.3 | 16 |
|  | 0.5 | 16 |
|  | 0.7 | 16 |
| 60 | 0.3 | 1 |
|  | 0.5 | 16 |
|  | 0.7 | 16 |
| 70 | 0.3 | 1 |
|  | 0.5 | 16 |
|  | 0.7 | 16 |

EXAMPLE 7

A further study was carried out using one level of moisture concentration, 70%, at pH levels of 5.2, 5.5 and 6.0 for kibs as prepared in Example 1 and gravy formulations as prepared in Example 3. Results are summarized in Table C.

TABLE C

Stability with Benzyl Alcohol At Varying pH (70% H₂O)

| Type | % Benzyl Alcohol | pH | Weeks Stable |
|---|---|---|---|
| Solid | 0.5 | 5.2 | 16 |
|  | 0.5 | 5.5 | 16 |
|  | 0.5 | 6.0 | 16 |
|  | 0.7 | 5.2 | 16 |
|  | 0.7 | 5.5 | 16 |
|  | 0.7 | 6.0 | 16 |
| Gravy | 0.5 | 5.2 | 16 |

TABLE C-continued

Stability with Benzyl Alcohol At Varying pH (70% H₂O)

| Type | % Benzyl Alcohol | pH | Weeks Stable |
|---|---|---|---|
|  | 0.5 | 5.5 | 16 |
|  | 0.5 | 6.0 | 16 |
|  | 0.7 | 5.2 | 16 |
|  | 0.7 | 5.5 | 16 |
|  | 0.7 | 6.0 | 16 |

EXAMPLE 8

A further study was conducted with benzyl alcohol to determine its efficiency as both antibacterial and antimicotic agent using a gravy formulation (pH 5.2) similar to Example 3. In this experiment, benzyl alcohol was tested alone and in the presence of the antimycotic agent, potassium sorbate, previously used in the preceding studies. The optimal levels of benzyl alcohol were determined for a series of moisture levels and compared to the effectiveness of benzyl alcohol at the same level in combination with 0.3% potassium sorbate. The results are summarized in Table D and the Table of Minimum Effective Concentrations.

TABLE D

Stability with Benzyl Alcohol Alone and Combined With 0.3% Potassium Sorbate

| % H₂O | % Benzyl Alcohol | Weeks Stable Benzyl Alcohol only | Weeks Stable with 0.3% Potassium Sorbate |
|---|---|---|---|
| 40 | 0.3 | 1 | 16 |
|  | 0.5 | 16 | 16 |
|  | 0.7 | 16 | 16 |
| 50 | 0.3 | 1 | 16 |
|  | 0.5 | 16 | 16 |
|  | 0.7 | 16 | 16 |
| 60 | 0.3 | 1 | 16 |
|  | 0.5 | 16 | 16 |
|  | 0.7 | 16 | 16 |
| 70 | 0.5 | 2 | 16 |
|  | 0.7 | 16 | 16 |

EXAMPLE 9

2-phenylethyl alcohol and sec-phenylethyl alcohol were also studied as preservatives in gravy formulations similar to Example 3 covering moisture levels of 40% through 70% at several levels of the preservatives. The preparations were inoculated using the standard multi-component inoculum previously described and plated out periodically at weekly intervals for a period of 16 weeks at which time the test was discontinued. Results of the studies are summarized in Table E and the Table of Minimum Effective Concentration.

TABLE E

Stability (pH = 5.2) with 2-Phenethyl Alcohol and Sec-Phenethyl Alcohol

| % H₂O | % Alcohol | Weeks Stable 2-Phenethyl Alcohol | Weeks Stable sec-Phenethyl Alcohol |
|---|---|---|---|
| 40 | 0.1 | 4 | 5 |
|  | 0.3 | 16 | 16 |
|  | 0.5 | 16 | 16 |
|  | 0.7 | 16 | 16 |
| 50 | 0.1 | 2 | 3 |
|  | 0.3 | 16 | 16 |
|  | 0.5 | 16 | 16 |
|  | 0.7 | 16 | 16 |
| 60 | 0.3 | 2 | 2 |
|  | 0.5 | 16 | 16 |

TABLE E-continued

Stability (pH = 5.2) with 2-Phenethyl Alcohol and Sec-Phenethyl Alcohol

| % H₂O | % Alcohol | Weeks Stable 2-Phenethyl Alcohol | Weeks Stable sec-Phenethyl Alcohol |
|---|---|---|---|
|  | 0.7 | 16 | 16 |
| 70 | 0.3 | 1 | 1 |
|  | 0.5 | 16 | 16 |
|  | 0.7 | 16 | 16 |

TABLE OF MINIMUM EFFECTIVE CONCENTRATION
Wt % of Product (Wt % of Moisture)

| % H₂O | Benzyl Alcohol | Sec-Phenethyl Alcohol (WITH SORBATE AT 0.3%) | 2-Phenethyl Alcohol | Benzyl Alcohol (NO SORBATE) |
|---|---|---|---|---|
| 25 | 0.05 (.20) | — | — | — |
| 30 | 0.05 (.17) | — | — | — |
| 40 | 0.3 (.75) | 0.3 | 0.3 | 0.5 (1.2) |
| 50 | 0.3 (.6) | 0.3 | 0.3 | 0.5 (1.0) |
| 60 | 0.5 (.83) | 0.5 | 0.5 | 0.5 (0.83) |
| 70 | 0.5 (.7) | 0.5 | 0.5 | 0.7 (1.0) |

EXAMPLE 10

Benzyl Alcohol as Anti-Mite Agent

Using the process set forth in Example 1, two kib formulations having moisture contents of 25% and 60% were prepared.

| Ingredient | (25% H₂O) | (60% H₂O) |
|---|---|---|
| Wheat gluten | 98.5 | 50 |
| Soy bean oil meal | 39.5 | 20 |
| Poultry meal | 30 | 15 |
| Meat meal | 15 | 7.5 |
| Corn Meal | 11.5 | 6.0 |
| Tallow | 49.5 | 25.0 |
| Carrageenan | 24.5 | 12.5 |
| Potassium sorbate | 1.5 | 1.5 |
| Tween 80 | 1.25 | 1.25 |
| Span 80 | 3.75 | 3.75 |
| High fructose corn syrup | 148.0 | 75.0 |
| Water | 85.5 | 280.0 |

Each of these batches was subdivided into five portions and benzyl alcohol was added at five different levels—namely 0.5%, 0.75%, 1.00%, 1.25% and 1.50% and subjected to mite studies. According to the mite test procedure, a two-gram sample of each product is placed into 20 small vials and each vial is innoculated with ten gravid mites (Tyrophagus putrescintise) which have been established as viable. The vials are stored at 25° C. and 85% R.H. and at 3, 6, 12 and 16 week periods, five replicate samples are removed from storage and examined for live mites. The samples are considered non-stable by the presence of an average of 30 live mites per vial. After 16 weeks, all of the samples of the experiment were found to be stable.

Comparable kib formulations which do not contain an added benzyl alcohol component have been established as lacking in both bacterial and mite stability. Typical mite stability in a 25% moisture product is effected by the incorporation of propylene glycol at a level in excess of 3% (usually about 5%) by weight of the product. It is therefore surprising that as little as 0.5% of an aromatic, monohydric alcohol is able to effect mite stability.

EXAMPLE 11

An intermediate-moisture dog food is prepared having the following formulation:

| Ingredient | Parts |
|---|---|
| Soy grits | 31.8 |
| Beef tripe | 24.5 |
| Sucrose | 19.3 |
| Beef trimmings | 10.7 |
| Calcium phosphate | 2.2 |
| Soy hulls | 2.1 |
| Tallow | 2.1 |
| Propylene glycol | 2.0 |
| Whey | 1.5 |
| Sodium chloride | 1.2 |
| Emulsifier | 1.0 |
| Calcium carbonate | 0.9 |
| Benzyl alcohol | 0.5 |
| Garlic | 0.2 |
| Vitamins | 0.2 |
| Dye | Trace |
| Water | sufficient for 27.5% moisture |

The food is prepared by chopping and grinding the tripe and beef trimmings into small pieces. The ground meat, along with propylene glycol, emulsifier, tallow water and benzyl alcohol are formed into a slurry in a jacketed agitated cooker. The ingredients are brought to a boil. The remaining ingredients, which are dry, are mixed and added to the slurry in the cooker and the total mixture heated to above 180° F. with a heating time of 15–20 minutes. The mix is discharged from the cooker and cooled rapidly. The cooled product is formed into short stands of about 1–3" in length and 5/32" in diameter by passing through an extruder. The extruded product is formed into patties and packaged in a cellophane wrap. The product is stable against microbiological and mite growth.

EXAMPLE 12

This example describes the preparation of a stable cat food, having a moisture content of 45%, from the following ingredients:

| Slurry | (%) | Dry | (%) |
|---|---|---|---|
| Whole ground chicken | 24.0 | Dextrose | 15.1 |
| Liver | 9.0 | Corn flour | 6.2 |
| Fish Meal | 5.0 | Oat flour | 6.2 |
| Animal Fat | 7.5 | Sodium Caseinate | 6.2 |
| Phosphoric Acid | 1.5 | CMC | 1.6 |
| 2-phenethyl alcohol | 1.0 | Solka-floc | 1.45 |
| Emulsifier | 0.32 | Salt | 1.5 |
| Water | 11.83 | Vitamins | 0.073 |
|  |  | Dye | 0.01 |

The cat food is prepared by chopping and grinding the meats into small pieces which are then added to a jacketed cooker along with the emulsifiers, animal fat, and fish meal. These ingredients are brought to a boil and then the remaining slurry ingredients are added and the total slurry is cooked about one hour, thereby effecting pasteurization and producing a liquified slurry composition. The slurry is then finely ground through an emulsifier into a more or less pulpy, pumpable, flowable puree consistency.

The dry ingredients are mixed together and added to the hot slurry in a jacketed double sigmabladed mixer.

The total mix is heated for 15 minutes until it reaches 190° F.

The cooked dough is extruded hot into one quarter inch pellets which are immediately cooled by passing them over a cooling screen, transmitting dry cool air, to an ambient temperature of 80° F. The cooled pellets are then packaged in cellophane.

The above description has been for the purpose of teaching the person of ordinary skill in the art how to practice the present invention. The description is not intended to detail each and every modification and variation of the invention which will become apparent to the skilled worker upon reading. It is intended, however, that all such modifications and variations be included within the scope of the present invention which is defined by the following claims.

We claim:

1. In a food product containing fat, proteinaceous and farinaceous ingredients, a moisture content of from 12% to 80% by weight and a preservation system which is effective to prevent microbial or mite growth, the improvement consisting essentially of said preservation system containing a monohydric, aromatic alcohol in an amount effective to prevent the growth of mites, said monohydric aromatic alcohol being selected from the group consisting of benzyl alcohol, 2-phenyl ethanol, sec-phenyl ethanol, 3-phenyl-1-propanol, 1-phenyl-1-propanol, 2-phenyl-1-propanol, 2-phenyl-2-propanol, 1-phenyl-2-butanol, 2-phenyl-1-butanol, 3-phenyl-1-butanol, 4-phenyl-2-butanol, dl-1-phenyl-2-pentanol, 5-phenyl-1-pentanol, 4-phenyl-1-butanol, and combination of these and said preservation system being free of antimite agents other than said monohydric alcohol.

2. A food according to claim 1 which contains proteins, carbohydrates, vitamins and minerals in amounts effective to provide a nutritionally-balanced diet for dogs.

3. The food product of claim 1 wherein the monohydric alcohol is present at a level in excess of 0.1% by weight of the food product.

4. The food product of claim 1 wherein the monohydric alcohol is benzyl alcohol, 2-phenylethanol, sec-phenylethanol or combinations thereof and is employed in an amount of from about 0.15 to about 1.0% based on the weight of the food.

5. A food product according to claim 1 wherein the aromatic alcohol is employed in an amount of from about 0.15 to about 1.5% of the moisture content of the food.

6. An improved food product according to claim 5 wherein the aromatic alcohol is employed in an amount of from about 0.75 to about 1.25% of the moisture content of the food.

7. An improved food product according to claim 5 wherein the moisture content of the food is within the range of from 12 to 50%.

8. An improved food product according to claim 7 wherein the moisture content is within the range of from 15 to 35% and the product contains sufficient amounts of protein, fat, carbohydrate, vitamins, and minerals to provide a nutritionally-balanced diet for dogs.

9. An improved food product according to claim 8 which comprises at least 10% meat and meat by-products and sufficient vegetable and other proteinaceous materials to provide a total protein content of at least 19%, both percentages based on the weight of the food.

10. An improved food product according to claim 9 which comprises from about 6 to about 12% fat.

11. An improved food product according to either of claims 1 or 10 wherein the pH of the product is within the range of from about 4 to about 8.

12. A food product according to claim 5 wherein the moisture content of the food is within the range of from 50 to 80%.

13. A food product according to claim 5 wherein the aromatic alcohol consists of benzyl alcohol.

14. The food product of claim 5 wherein the monohydric alcohol contained in the preservation system is the sole antibacterial agent present in said system.

* * * * *